(12) United States Patent
Ståhlberg et al.

(10) Patent No.: US 8,655,312 B2
(45) Date of Patent: Feb. 18, 2014

(54) WIRELESS ACCESS POINT DETECTION

(75) Inventors: Mika Ståhlberg, Espoo (FI); Jarno Niemalä, Espoo (FI)

(73) Assignee: F-Secure Corporation, Helsinki (FI)

( * ) Notice: Subject to any disclaimer, the term of this patent is extended or adjusted under 35 U.S.C. 154(b) by 0 days.

(21) Appl. No.: 13/136,848

(22) Filed: Aug. 12, 2011

(65) Prior Publication Data

US 2013/0040603 A1 Feb. 14, 2013

(51) Int. Cl.
*H04M 1/66* (2006.01)
*H04B 7/00* (2006.01)
*H04L 9/32* (2006.01)

(52) U.S. Cl.
USPC .......................... 455/410; 455/525; 713/168

(58) Field of Classification Search
USPC .................. 455/410–411, 525, 422.1, 426.1, 455/448–449; 726/22, 1–21, 27–30; 713/168; 370/328, 338
See application file for complete search history.

(56) References Cited

U.S. PATENT DOCUMENTS

| | | | | |
|---|---|---|---|---|
| 2006/0236391 A1* | 10/2006 | Kim et al. | ........................ | 726/22 |
| 2007/0049323 A1* | 3/2007 | Wang et al. | .................... | 455/525 |
| 2007/0058601 A1* | 3/2007 | Davis et al. | .................... | 370/338 |
| 2007/0180244 A1 | 8/2007 | Halasz et al. | ................. | 713/168 |
| 2007/0249291 A1* | 10/2007 | Nanda et al. | .................... | 455/73 |
| 2008/0070563 A1* | 3/2008 | Adya et al. | ................. | 455/422.1 |
| 2008/0178294 A1* | 7/2008 | Hu et al. | ......................... | 726/24 |
| 2008/0301773 A1* | 12/2008 | Achtari et al. | ..................... | 726/3 |
| 2010/0214956 A1* | 8/2010 | Law et al. | ..................... | 370/255 |
| 2010/0318614 A1 | 12/2010 | Sager et al. | ................... | 709/206 |
| 2011/0270973 A1* | 11/2011 | Liao | .............................. | 709/224 |

FOREIGN PATENT DOCUMENTS

WO WO-2006/093634 A1 9/2006
WO WO-2008/051933 A2 5/2008

OTHER PUBLICATIONS

Titi, X. et al.; "Trust Management for Selecting Trustworthy Access Points"; IJCSI International Journal of Computer Science Issues, vol. 8, Issue 2; Mar. 2011; pp. 22-31.

\* cited by examiner

*Primary Examiner* — Mahendra Patel
*Assistant Examiner* — Michael Mapa
(74) *Attorney, Agent, or Firm* — Harrington & Smith

(57) ABSTRACT

According to aspects of the present invention there are provided methods and apparatus for detecting a suspect wireless access point in a communication network including a plurality of wireless access points providing access services to client devices. Identity information associated with the wireless access points is collected from a multiplicity of client devices. A reputation request is received from a client device, the request including identity information of an available wireless access point. The received identity information is compared with the collected identity information for determining an indication of trust of the available wireless access point. The indication of trust of the available wireless access point is transmitted to the client device. The wireless access points may include a cellular wireless access point or base station, wireless access point, a Wi-Fi access point, or a femto-cell access point.

35 Claims, 4 Drawing Sheets

WIRELESS ACCESS POINT DETECTION

TECHNICAL FIELD

The present invention relates to methods and apparatus for determining the identity of wireless access points providing access services to client devices. In particular, the present invention relates to methods and apparatus for performing suspect wireless access point detection.

BACKGROUND

Criminals such as hackers are keen to exploit wireless access points so they can maliciously steal sensitive information from or commit fraud on client devices connecting with such wireless access points. Some ways of exploiting a wireless access point is to masquerade as the wireless access point and attack client devices that connect with the "fake" wireless access point. Some of the most common attacks on client devices employed by criminals are the so-called "phishing" or the "man-in-the-middle" attacks.

A client device may comprise or represent any device used for wireless communications. Examples of client devices that may be used in certain embodiments of the invention are wireless devices such as mobile telephones, terminals, smart phones, portable computing devices such as lap tops, hand-held devices, tablets, net-books, computers, personal digital assistants and other devices that can connect wirelessly to a communication network.

A wireless access point may comprise or represent any device used to wirelessly connect a client device to a communications network and provides access services to the client device. Examples of wireless access points that may be used in certain embodiments of the invention are wireless devices such as wireless local area network wireless access points, Wi-Fi access points, wireless access points, radio base stations, femto-cell base stations, cellular or mobile base stations, or any other base station or wireless access point based on second, third, fourth generation (2G/3G/4G) and beyond mobile technologies or standards (eg Global System for Mobile Communications (GSM), CDMA-2000, Universal Mobile Telecommunications System (UMTS), Worldwide Interoperability for Microwave Access (WiMAX), Long Term Evolution (LTE), LTE Advanced).

A phishing attack typically involves an "attacker" attempting to acquire sensitive information from users of client devices such as usernames, passwords, credit card details by masquerading as a trustworthy entity (eg a wireless access point such as a cellular base station) in a communication network. Such a trustworthy entity may be a cellular base station for a mobile telecommunications network or even a known Wi-Fi access point of a wireless local area network. In any event, the attacker may masquerade as a legitimate wireless access point using their own wireless access point (eg a rogue or "fake" wireless access point). The user of the client device when connecting to the wireless access point is fooled into connecting their client device to the "fake" wireless access point instead of the trustworthy or legitimate wireless access point and thus an attacker may gain access to sensitive information.

A man-in-the-middle attack is a form of eavesdropping in which an "attacker" makes independent connections with a user's client device and acts as a relay between the client device and a trustworthy entity, such as a wireless access point or even another client device over a communication network. The attacker can then control or eavesdrop on the user's communication session over the communication network. In these attacks, the attacker must be able to intercept all messages into and out of the client device, and can inject new false messages into the communication session. This can be particularly straightforward when the attacker is within the reception range of an unencrypted wireless access point.

A suspect wireless access point may comprise or represent any wireless access point with a reputation that is regarded as, but is not limited to, unknown, suspect, untrusted, untrustworthy, blacklisted, potentially rogue or rogue.

In another example, when mobile telephones connect with a wireless access point such as a base station of a mobile operator an authentication key is retrieved from the mobile operator's network. This is used to allow a secure communications session to be set up. However, the user of the mobile telephone is usually unaware of the identity of any of the mobile operator's base stations. They simply trust that the base station the mobile telephone connects with is their mobile operators. Hackers can use their own base station and masquerade as a legitimate base station such that the user of the mobile telephone unwittingly connects with the hacker's base station, which acts as a relay between the mobile operator and the mobile telephone. This would allow hackers to eavesdrop on packets passed between the mobile telephone and the network operator or even gain root access to the mobile telephone. They could also retrieve the secret keys used to secure the communications session, which would allow the hacker to listen to other people's mobile telephone calls, or make mobile telephone calls in their name, and access their voicemails. As femto-cell base stations become increasingly popular, almost anyone could build a cheap call interception device that can be used against the subscribers of a mobile operator in a "phishing", "man-in-the-middle", or any other malicious attack.

Conventionally, client devices such as mobile phones simply show a mobile operators name on the device screen. This only notifies the user that they are connected to the mobile operators network, nothing more. There is no indication as to the trustworthiness of the base station they are using to access the mobile operators network. The base station could in fact be a "fake" wireless access point that is being used to perform a "man-in-the-middle" attack. Other client devices such as laptops may execute a network connection application to assist in wirelessly connecting the client device to a public Wi-Fi access point in a café or an airport. Typically this kind of application may provide a general warning to the user of the client device about the dangers of connecting to a public Wi-Fi access point, but little else is provided in guiding the user to make a decision as to whether the Wi-Fi access point is trustworthy or not.

As mentioned above, rogue or "fake" wireless access points are a serious problem for client devices connecting wirelessly to communication networks. Although there are plenty of solutions for the problem of detecting suspect wireless access points in corporate infrastructure, there are no publicly known solutions for the problem of detecting suspect or rogue wireless access points in homes, cafes, airports, etc, where users of client devices may unwittingly connect to the wireless access point and get maliciously attacked by a phishing or targeted man-in-the-middle attack.

SUMMARY

It is an object of the present invention to reduce the risk to users and their client devices of being exposed to suspect wireless access points and to avoid the user unwittingly connecting their client device to a suspect wireless access point, especially a rogue wireless access point. The present invention provides methods and apparatus of performing wireless access point detection that minimises the probability of a user connecting to a suspect wireless access point, which in turn minimises the probability of being targeted for attack by a rogue entity.

According to a first aspect of the invention there is provided a method for detecting a suspect wireless access point in a communication network including a plurality of wireless access points providing access services to client devices. The method includes collecting identity information associated with the wireless access points from a multiplicity of client devices and receiving a reputation request from a client device, the request including identity information of an available wireless access point. The received identity information is compared with the collected identity information to determine an indication of trust of the available wireless access point based on the comparison, and transmitting the indication or trust of the available wireless access point to the client device.

As an option, the invention further comprises maintaining the collected identity information as a record of sets of identity information, each set of identity information associated with one of the wireless access points. In addition, the method includes heuristically determining an indication of trust associated with each set of identity information. The indication of trust being set to a level of trust including at least one trusted, unknown, or untrusted. Optionally, the step of comparing further includes comparing the received identity information with the sets of identity information associated with each wireless access point, and determining the indication of trust of the available wireless access point from the indication of trust of a corresponding set of identity information.

The wireless access points include at least one type of wireless access point in the group of a cellular wireless access point or a base station (eg a GSM, LTE, 2G/3G/4G or beyond access point), a Wi-Fi access point, and any other wireless access point used for connecting client devices to the communications network.

Alternatively or in addition to, the invention further includes maintaining a record of trusted identity information, where trusted information is added to the record when the identity information is determined to be stable over a first period of time. Preferably, comparing further includes comparing the received identity information with the identity information stored in said record to determine the indication of trust. Optionally, maintaining the record of trusted information includes removing a portion of the trusted information from the record when the identity information associated with the portion of trusted information is determined to be unstable over a second period of time. Preferably, defining the reputation of the available wireless access point as trusted when the received identity information substantially matches the trusted information stored in the record.

The method optionally includes determining or defining the indication of trust of the available wireless access point to be untrusted or suspect when significant identity information associated with the received identity information is substantially different to the corresponding significant identity information associated with the information stored in the record of trusted information and/or sets of identity information. Pieces or portions of the identity information associated with each wireless access point are considered to be significant if these pieces can be used to substantially identify the wireless access point. The significant identity information may include an identity code of the wireless access point, an address or cell identifier of the wireless access point, a hardware identifier of the wireless access point, and/or an identifier of the wireless access point, frequencies used by the wireless access point. Alternatively or in addition to, the significant identity information may include at least one of a base station identity code of the wireless access point, public internet protocol (IP) address of the wireless access point, a Media Access Control (MAC) address of the wireless access point, a service set identifier (SSID) of the wireless access point, a cell identifier of the wireless access point, and/or a base station identifier of the wireless access point.

Optionally, the method includes receiving a report from one of the client devices indicating the available wireless access point as untrusted or suspect and defining the indication of trust of the available wireless access point to be untrusted or suspect. In addition, maintaining the record of trusted identity information includes removing the portion of the trusted information associated with the identity information of the available wireless access point from the record. The method may optionally include transmitting the indication of trust or reputation of the available wireless access point to the client devices associated with the available wireless access point.

As an option, the method includes receiving one or more of the reputation requests over a second communication network different to the communication network including the wireless access points. Preferably, the method includes updating the collected identity information with the received identity information associated with the available wireless access point.

According to a second aspect of the invention there is provided a method for use by a client device in detecting a suspect wireless access point. The method including detecting an available wireless access point providing access services to the client device and transmitting to a reputation system a reputation request including identity information associated with the available wireless access point. From the reputation system, receiving a reputation associated with the available wireless access point, connecting with the available wireless access point or maintaining a connection with the available wireless access point when the indication of trust or reputation indicates the available wireless access point as trusted, and/or disconnecting from the available wireless access point and/or detecting another available wireless access point when the indication of trust or reputation indicates the available wireless access point as suspect.

As an option, the method includes transmitting the reputation request over a second communication network that is different to the communication network including the available wireless access point. In addition, the method may include step of detecting a malicious attack on the client device when connected to the available wireless access point and, in response, transmitting to the reputation system further information reporting the available wireless access point as suspect. Optionally, the method includes receiving reputation information from the reputation system indicating the available wireless access point is suspect, and in response, notifying the user of the client device the available wireless access point is suspect or disconnecting from the available wireless access point.

Preferably, the identity information of the wireless access points or available wireless access point includes at least one wireless access point parameter in the group of a public address of the wireless access point, a hardware identifier or address of the wireless access point, an identifier of the wireless access point, wireless access point identity code or base station identity code, a cell identifier, a communication network operator identity or mobile operator identity, an internal internet protocol (IP) address or address range of the wireless access point, a public IP address of the wireless access point, a connection type for the public IP address of the wireless access point, the wireless access point type, a service set identifier (SSID) of the wireless access point, the client device's physical location, the wireless signal strength of the wireless access point, the wireless network type of the wireless access point, the security settings of the wireless access point, data representative of the ability to send reputation requests over the wireless access point, and data representative of the ability to correctly resolve domain name server queries over the wireless access point, information or data representative of the identity or signature of the wireless access point, and any other accessible identification information available about the wireless access point to a client device.

According to further aspects of the invention there is provided a reputation system including one or more servers arranged for detecting a suspect wireless access point in the communication network including a plurality of wireless access points providing access services to client devices, and a client device arranged to detect a suspect wireless access point in the communication network using the reputation system.

According to a further aspect of the present invention there is provided a computer program including computer program instructions, which when executed on one or more processors of a reputation system, performs the method of detecting a suspect wireless access point as described.

According to a another aspect of the present invention there is provided a computer readable medium including computer program instructions stored thereon, which when executed on one or more processors of a client device, performs the method of detecting a suspect wireless access point as described.

DETAILED DESCRIPTION

Figure 1:
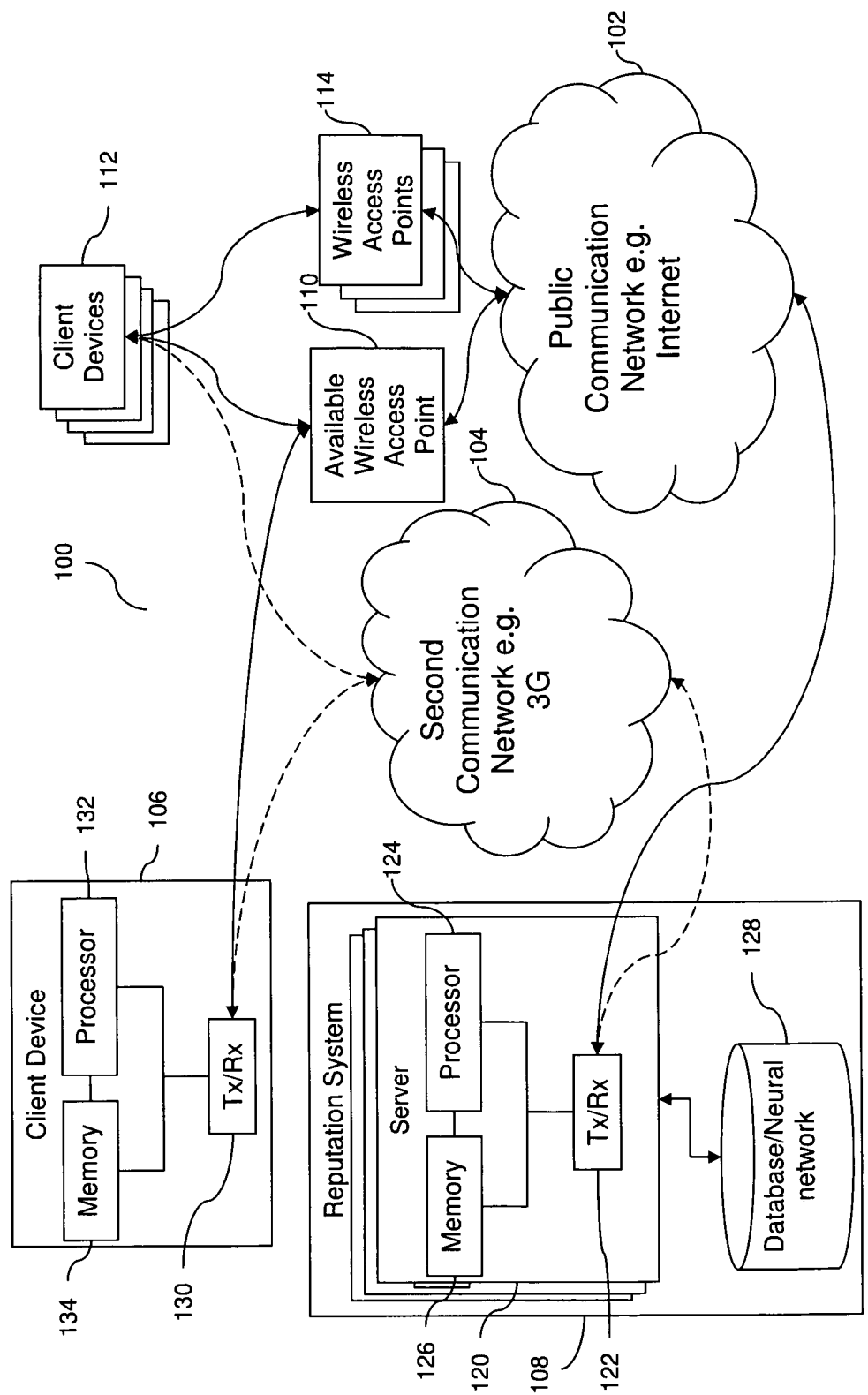
FIG. 1 illustrates schematically a communication system according to an embodiment of the invention.

In order to at least partially overcome the problems and issues described above, it is proposed herein to identify wireless access points providing access services to client device by external wireless access point properties available to the client device. In particular, these problems and issues can be alleviated by building up or collecting wireless access point identity information or reputation information from a multiplicity of client devices in a reputation system, which may include one or more networked backend servers. The system can respond to a client device's reputation request about an available wireless access point by sending an indication of trust or reputation information associated with the available wireless access point to the client device. The indication of trust or reputation may comprise or represent data representative of the trustworthiness or the reputation status of a wireless access point or information associated with the wireless access point.

The indication of trust or reputation may include, but is not limited to, data representative of various levels of trust indicating the wireless access point as trusted, unknown, suspect, untrusted, blacklisted, rogue, or potentially rogue. Although the indication of trust or reputation can be set to trusted, unknown, or untrusted, it is to be appreciated that the indication of trust or reputation could represent a range of discrete or continuous values or probabilities indicating various levels of trust or granularities of trust.

The identity information that used to identify a wireless access point (also known as wireless access point identity information) can be used to track the behaviour of the wireless access point and determine an indication of trust or define the reputation (eg trusted, unknown, untrusted, suspect, etc.) of the wireless access point. The identity information can include any information available to the client device for determining the identity and behaviour of the wireless access point. For example, the wireless access point may broadcast its identity information (eg in GSM the base station identifier code is broadcast to all mobile phones in range) or send its identity information in response to queries or requests for connection from the client devices. The client device may also detect some of the identity information from the presence of the wireless access point, for example, frequencies of broadcast, control and traffic channels. The identity information that may be available to the client device from the wireless access point can include, but is not limited to, one or more of the following wireless access point parameters or properties:

wireless access point internal IP address range;
cell ID or cell identifier of the wireless access point;
identity code of the wireless access point (eg in GSM a base station identity code is used to uniquely identify a base station);
a communication network operator identity (eg a mobile operator identity);
public IP address by which the wireless access point is visible over the public communication network, for example the internet. This can be obtained from the IP address of the reputation request when it is sent via the wireless access point over the public communication network;
connection type for the public IP address (eg Fixed, DSL, 3G, UMTS, LTE, GSM, or other type of wireless access point, etc);
wireless access point type (eg fixed, ad-hoc, mobile);
hardware identifier of the wireless access point;
base station identifier of the wireless access point;
base station address of the wireless access point;
wireless access point service set identifiers (SSID) and the Media Access Control address (MAC address);
client device's physical location;
wireless access point physical location (eg if a base station or wireless access point moves around may be considered suspicious);
the wireless access point's wireless signal strength (eg base station signal strength to mobile telephone; or Wi-Fi Signal Strength of a Wi-Fi access point);
the wireless access point's network type (eg GSM network, LTE network or Wi-Fi network type);
security settings of the wireless access point (eg whether encryption is used, what type of encryption or cryptography is used);
the ability to send reputation requests over the wireless access point;
the ability to resolve domain name server (DNS) queries over the wireless access point;

the ability to correctly resolve domain name server (DNS) queries over the wireless access point, to which addresses of well known domains resolve to;

whether wireless access point offers some kind of log in page, such as airports, and signature identifying content of web page (title, number of images, number of forms, fields in forms, keywords (user name, credit card, etc);

age of the wireless access point (from first client report);

connection history of wireless access point, (number of hits, number of hits per time interval);

what other SSIDs or base station IDs are seen by the client device (It is unusual that there would be two wireless access points in with close distance having the same ID. Alarm if user requests reputation in area where there have been only one wireless access point with a given SSID and now there are two;

information or data representative of the identity or signature (eg a set of information, which in combination, is practically a unique identifier) of the wireless access point;

carrier frequencies or channel frequencies (eg traffic channels frequencies, control channel frequencies, broadcast channel frequencies) used by the wireless access point;

set of physical or logical channels (eg traffic channels, control channels, broadcast channels) used by the wireless access point;

any other information available to the client device for determining the identity and behaviour of the wireless access point, etc.

FIG. 1 illustrates schematically a communication system 100 including a public communication network 102 (eg the Internet) and a second communication network 104 (eg a 3G mobile network), which are in communication with a client device 106, a reputation system 108, an available wireless access point 110 for providing access services to client devices 106 or 112, which include a plurality of other client devices 112, and a plurality of other wireless access points 114 for providing access services to the client devices 106 or 112. The wireless access points 110 and 114 provide the client devices 106 and 112 with access services to the public communication network 102. The wireless access points 110 and 114 may include, but are not limited to, at least one type of wireless access point in the group of a cellular wireless access point (eg a GSM, LTE, 2G/3G/4G or beyond access point), a base station, a Wi-Fi access point, and any other wireless access point used for connecting client devices to a communications network.

The reputation system 108 includes one or more servers 120, each server 120 including a transmitter/receiver unit 122, a processor 124, and a memory unit or memory 126 connected to each other. The transmitter/receiver unit 122 may be configured for communicating with a multiplicity of client devices 106 and 112 over the communication network 102 or the second communication network 104. The memory 126 can be for use in collecting and storing data and applications, and the processor 124 may execute the applications, and among other things, applications or processes for detecting a suspect wireless access points in communication network 102, which includes available wireless access point 110 and client device 106. The one or more servers 120 are in communication with each other. The reputation system 108 may also include or have access to a database 128 for collecting and/or storing identity information. The database 128 may also include maintaining a record of trusted information or sets of identity information associated with wireless access points. The reputation system 108 can also include other processing resources (eg a neural network) or storage media for storing, processing and accessing data or information required by said one or more servers 120, applications, or processors 122.

For example, one or more servers 120 can be arranged for use in detecting a suspect wireless access point in the communication network 102, in which a server 120 may include the receiver 122, the transmitter 122, a memory 126, and processing logic or one or more processors 124. The processing logic 124 can be connected to the receiver 122, to the transmitter 122, and to the memory 126. The receiver 122 and processing logic 124 are configured for collecting identity information associated with the wireless access points 110 and/or 114 from a multiplicity of client devices 106 and/or 112. The receiver 122 is further configured to receive a reputation request from a client device 106, the request including identity information of an available wireless access point 110. The processing logic 124 includes comparing logic for comparing the received identity information with the collected identity information, and determining logic for determining an indication of trust of the available wireless access point 110 based on the comparison. The transmitter 122 is configured to transmit the indication of trust to the client device 106.

The reputation system 108 includes the one or more servers as described, which can be in communication with a database 128 for storing and processing the collected identity information for use in determining an indication of trust associated with each of the wireless access points 110 and/or 114. Although the reputation system 108 is shown as one or more servers 120, which can be backend servers, it is to be appreciated that reputation system 108 can include any computing system that includes storage, processing, and communications hardware and/or software that performs the collection and maintenance of the identity information and processing the identity information for detecting a suspect wireless access point in communications network 102.

The client device 106 also includes a transmitter/receiver unit 130, a processor 132, and a memory 134, which are connected with each other. The transmitter/receiver unit 130 may be configured for communicating with the one or more wireless access points 110 and 114 to gain access to the communication network 102 or for communicating with reputation system 108 over the communication network 102 and/or the second communication network 104. The memory unit or memory 134 can be for use in storing data and applications, and the processor 122 may execute the applications, and among other things, applications or processes for detecting suspect wireless access points in communication network 102.

In particular, the client device 106 may be arranged to detect a suspect wireless access point in the communication network 102, using the receiver 130, transmitter 130, memory 134, and processing logic or processor 132, in which the processor 132 is connected to the receiver 130, to the transmitter 130, and to the memory 134. The receiver 130 and processing logic 132 are configured for detecting an available wireless access point 110. The transmitter 130 is configured to transmit to a reputation system 108 a reputation request including identity information associated with the available wireless access point 110. The receiver 130 is further configured to receive from the reputation system 108 an indication of trust associated with the available wireless access point 110. The processor logic 132 is configured to connect with the available wireless access point 110 or maintain a connection with the available wireless access point 110 when the indication of trust indicates the available wireless access point to be trusted. The processor logic 132 is also configured to disconnect the client device 106 from the available wireless access point 110 and/or detect another available wireless access point 110 or 114 when the indication of trust indicates the available wireless access point 110 is suspect or untrusted.

The reputation system 108 builds up or collects wireless access point identity information received from a multiplicity of client devices 106 and/or 112. The collected identity information may be stored or processed in memory 126 of one or more servers 120 or a database/neural network 128. In particular, reputation system 108 performs collecting of identity information associated with the wireless access points 110 and 114 from a multiplicity of client devices 106 and 112. The identity information associated with each wireless access point 110 and 114 can be reported by the client devices 106 and 112 to reputation system 108, or can be included in reputation requests from the client devices 106 and 112.

On receipt of a reputation request from a client device 106 about an available wireless access point 110, the reputation request including identity information associated with the available wireless access point 110, the reputation system 108 determines an indication of trust of the available wireless access point 110 by comparing the received identity information with the collected identity information. The comparison of the received identity with the collected identity information may be defined by a set of instructions, rules and/or heuristics to determine whether the indication of trust associated with available wireless access point 110 is trusted or not. In particular, the indication of trust can be represented by data from a range of discrete or continuous values that define the trustworthiness of the available wireless access point. For example, the indication of trust could be set to data representative of levels of trust such as trusted, unknown, or untrusted.

The comparison may simply be based on matching or at least partially matching the received identity information with the collected identity information. Alternatively, collected identity information could be arranged to define a set of signatures of identity information associated with trusted, unknown, and/or untrusted identity information. Comparing may include processing the received identity information with the signatures heuristically to look for specific attributes and characteristics for detecting whether the received identity information relates to a trusted or suspect wireless access point (eg unknown or untrusted). Alternatively or in addition to the above-mentioned processing, comparing may be carried out based on neural network processing, where the received identity information is input to the neural network (which may have been trained on the collected identity information based on rules, heuristics, or temporal constraints) and outputs an evaluation or indication of trust as to whether the received identity information relates to a trusted or suspect wireless access point as a result.

Comparing the received identity information with the collected identity information may include processing or using a set of heuristic rules to determine whether available wireless access point 110 is trusted based on the received identity information and the collected identity information. The heuristic rules can be based on the tactics used in malicious attacks such as phishing or man-in-the-middle attacks or simply on the behaviour of wireless access points in general. Heuristic rules are used to analyse the identity information to determine the possible behaviour of wireless access points 110 and/or 114 and identify an indication of trust or define the reputation of each wireless access point 114 or the available wireless access point 110. The heuristic rules are based on the above-mentioned identity information and applied to the collected identity information and the received identity information.

As an example, a heuristic rule could be set to determine the indication of trust or reputation of a wireless access point to trusted if the wireless access point is used by many users and has a well known internet protocol address (eg the wireless access point has had 1000 users and has an IP associated with a large or well known internet service provider). a wireless access point having a large number of users could be identified when there is a large set of collected identity information associated with the wireless access point. In addition, another heuristic rule could be to set the indication of trust or reputation of a wireless access point to untrusted if the wireless access point is identified to be routed over an end user digital subscriber line regardless of the number of users or size of the set of identity information.

Another example of a heuristic rule could be set to determine the ability to send reputation requests over a wireless access point. If the wireless access point normally does not allow traffic to be routed until after the user of a client device 106 or 112 connecting to a wireless access point 110 or 114 gives their credit card details, but then if the wireless access point 110 or 114 suddenly starts to pass traffic without requiring credit card information, it may be considered to be untrusted or rogue.

Another rule could be set to determine the ability to correctly resolve domain name server (DNS) queries over the wireless access point to which addresses of well known domains resolve to. When addresses are from well known domains (eg bankofamerica.com or facebook.com), and if these addresses do not correctly resolve to the expected well known domains, then the wireless access point may be performing DNS spoofing and a possible man-in-the-middle attack could be under way, hence the wireless access point may be considered to be rogue or untrusted. This is an example of DNS "poisoning", where a wireless access point hijacks a DNS address of a well known domain or address. Airport WLANs are known to use this technique to display their landing page, but these addresses are usually well known and so the Airport WLA wireless access point can be marked trusted. Other heuristic rules for determining the indication of trust of the wireless access points 114 or the available wireless access point 110 are described below by way of example.

In addition to the heuristic rules, a client device 106 may report suspicious behaviour over a wireless access point, for example the SSL certificate of a bank's website fails to verify, which may indicate an SSL man-in-the-middle attack. Alternatively, an HTTPS address of a website may automatically be directed to an unsecure HTTP address, which is another known man-in-the-middle attack tactic. In this situation the client device 106 may send a report including identity information associated with the wireless access point and including a report that the wireless access point may be untrusted or rogue.

The reputation system 108 may process the collected identity information by organising or arranging the collected identity information into sets of identity information, which could be represented by a database 128 or stored in memory 126 of one or more servers 120. Each set of identity information could be associated with an identified wireless access point. Pieces or portions of the identity information associated with each wireless access point are considered to be significant if these pieces can be used to substantially identify the wireless access point. For each wireless access point, the collected identity information may be heuristically analysed and a set of identity information may be associated with the wireless access point such that the identity information within each set of identity information has the most significant pieces of identity information (eg cell ID, base station ID, hardware identifiers or addresses, SSID, location information and/or MAC addresses) that correspond with each other, at least partially or fully match. For each set of identity information associated with a wireless access point, at least one or two pieces of the significant identity information should correspond or match.

The sets of identity information may be heuristically analysed to determine the indication of trust associated with each set of identity information. For each wireless access point identified from the collected identity information, the indication of trust is set to a trust level, such as trusted, unknown, or untrusted, based on the heuristic rules applied to the sets of identity information and/or other information reported by client devices. The sets of identity information are updated or maintained when additional identity information is collected from the multiplicity of client devices. This additional identity information can include the received identity information associated with a reputation request from client device 106. On receiving the reputation request from client device 106, the received identity information of the available wireless access point 110 may be compared with the sets of identity information associated with each wireless access point in which the indication of trust of the available wireless access point 110 s determined from the indication of trust of a corresponding set of identity information (eg a set of identity information that most likely corresponds with the received identity information). If there is no correspondence or partial match, then the available wireless access point is unknown or untrusted. Alternatively or in addition to, the received identity information and the sets of identity information are heuristically analysed to determine the indication of trust of the available wireless access point 110.

Alternatively or in addition to organising or arranging the collected identity information into sets of identity information associated with the wireless access points, a record or database of trusted information could be maintained based on the collected identity information or sets thereof. Trusted information may be added to the record when the identity information is determined to be stable or does not significantly change over a first period of time. Comparing the received identity information with the collected identity information may further include comparing the received identity information with the identity information stored in said record to determine the indication of trust of the available wireless access point 110. Sets of heuristic rules could be applied to the record of trusted information and the received identity information when comparing the received identity information with the identity information stored in the record to determine the indication of trust of the available wireless access point 110.

In any event, the indication of trust of the available wireless access point is determined and data representing the result or indication of trust is sent to the client device 106. This allows client device 106 to make an informed decision to connect or disconnect from wireless access point 110 depending on whether its reputation is regarded as trusted or suspect (eg unknown or untrusted). Depending on this result, the client device 106 connects or maintains its connection with wireless access point 110 or disconnects from wireless access point 110 and/or searches for another wireless access point from the plurality of wireless access points 114 for access to communication network 102.

As already briefly described, when the client device 106 detects and/or connects to an available wireless access point 110, the client device 106 sends a reputation request to the reputation system 108. The reputation request includes identity information associated with the available wireless access point 110. This information can be used to identify the available wireless access point 110 for determining if the reputation of the available wireless access point 110 is trusted or suspect. The reputation request including the identity information can be sent via the available wireless access point 110 over the public communication network 102 to the reputation system 108. Alternatively, the client device 106 can send the reputation request and identity information via the second communication network 104, for example over a 2G/3G/4G or beyond data connection or via SMS, which ensures the reputation request of client device 106 is received by the reputation system 108 (as it may be intercepted by an untrusted/suspect/rogue wireless access point if sent over public communication network 102).

The reputation system 108 receives the reputation request from client device 106, the identity information contained therein about the available wireless access point 110 is used by reputation system 108 to determine whether the system 108 has heard about the available wireless access point 110 before and to determine an indication of trust or define its reputation as trusted or suspect.

As an example, the available wireless access point 110 may be a "Free public WiFi" that is new and resolves to home digital subscriber line (DSL) internet protocol (IP) address of a third generation internet protocol address (3G IP). The wireless access point 110 may initially have a low reputation or is considered untrusted (i.e. it is considered to be suspect such as a potentially rogue wireless access point) until a sufficient quantity of identity information associated with the available wireless access point 110 has been received by the reputation system 108 from the multiplicity of client devices 106 and/or 112. On receipt of more identity information from the client devices 106 and/or 112 associated with the available wireless access point 110, the reputation system 108 may "raise" its indication of trust or reputation from untrusted or suspect (i.e. potentially rogue) to trusted.

In another example, the available wireless access point 110 may be a home, café or airport Wi-Fi access point that has been present for a long period of time and has had a constant presence or a consistent behaviour over this period of time. A long period of time may be defined to be in the order of one or more days or weeks. Constant presence or consistent behaviour is determined when the identity information does not substantially change over the long period of time. More specifically, the identity information is considered not to substantially change when significant pieces of identity information such as the MAC address, and/or a set of MAC addresses in the case of an airport WLAN, and/or the public IP address does not change (is "stable" or unchanging) or remains consistent or constant over the long period of time. That is the relevant identity information reported and collected by the reputation system 108 is determined to be stable or substantially unchanging over a first period of time. The identity information associated with the available wireless access point 110 may not have substantially changed over the first period of time, which may allow reputation system 108 to define the available wireless access point 110 as trusted, for example the available wireless access point 110 has a "good" reputation.

The identity information associated with the available wireless access point 110 and the plurality of wireless access points 114 (also known as wireless access point identity information) is used to track the behaviour of the wireless access points 110 and 114 and define their reputation (eg trusted or suspect).

In relation to available wireless access point 110, the reputation system 108 retrieves wireless access point information (or identity information associated with the wireless access point 110) from reports and received reputation requests transmitted by those multiplicity of client devices 106 and 112 that may detect or connect with the available wireless access point 110. The reputation system 108 will receive a multiplicity of reputation requests from the multiplicity of client devices 106 and 112 that may detect or connect with the wireless access points 110 and 114. The received identity information associated with these wireless access points 110 and 114 is collected by reputation system 108.

As described above, the reputation system 108 may arrange or organise the collected identity information into sets of identity information associated with wireless access points 114, which may include the available wireless access point 110. Alternatively or in addition to, the reputation system 108 may also maintain a record of trusted information, in which some of the collected identity information is added to the record when the identity information is considered to be stable over a period of time. The sets of identity information or the record could be stored in a database 126 by on or more servers 120 of reputation system 108. Alternatively, this record and/or the collected identity information may be represented by a neural network system 126, which is used to process received identity information to define the reputation of the various wireless access points 110 and/or 114.

In another example, when client device 106 detects or connects with available wireless access point 110, a reputation request, which includes the identity information of the available wireless access point 110, is sent from the client device 106 to reputation system 108. The reputation associated with the available wireless access point 110 is defined by the reputation system 108 by comparing the received identity information from client device 110 with the collected identity information to determine an indication of trust of the available wireless access point 110. Alternatively or in addition to comparing with the collected identity information, the received identity information is compared with identity information stored in the record of trusted information. The indication of trust or reputation of the available wireless access point 110 can be defined as trusted, if the received identity information from client device 106, or enough of the received identity information from client device 106, matches the identity information stored in the record, the collected identity information, or sets of identity information associated with each wireless access point. Otherwise, the indication of trust or reputation of the available wireless access point 110 may be determined to be suspect or unknown.

For example, if significant identity information such as public IP and MAC addresses of the received identity information are significantly different when compared with the identity information stored in the record or in the sets of identity information associated with wireless access points, then the reputation system 108 determines that the indication of trust of the wireless access point 110 is unknown, suspect or untrusted.

The reputation system 108 responds to the client device 106 by transmitting data representative of the indication of trust of the available wireless access point to the client device 106. If the received data including the reputation indicates the available wireless access point 110 as trusted, then the client device 106 can connect or maintain its connection with the available wireless access point 110. However, if the received data including the reputation indicates the available wireless access point 110 as unknown, untrusted or suspect then the client device 106 should not connect to the available wireless access point 110 or if it has, the connection between the client device 106 and the available wireless access point 110 should be terminated. At the very least the user of the client device 106 should be warned that the client device 106 may be connecting to or has connected with is unknown, untrusted, suspect or potentially rogue.

The reputation system 108 can identify suspect wireless access points by age. Typically suspect wireless access points are in the area only for short durations. This temporal information can be used to warn the user of the client device 106 about any wireless access points that claim to be infrastructure wireless access points, but are only rarely available or have only been available for a short period of time.

The reputation of the available wireless access point 110 can be defined and changed during the time the client device 106 is connected to the available wireless access point 110 based on identity information associated with the available wireless access point 110 received from other client devices 112. The reputation of the available wireless access point 110 may change because one or the client devices 112 reports, to reputation system 108, a malicious attack when connected with the available wireless access point 110. The reputation system 108 may then warn client device 106 (and other client devices known to it) that available wireless access point 110 is suspect or a potentially rogue wireless access point. The client device 106 can then choose to disconnect from the available wireless access point 110.

For example, if another client device reports an SSL man-in-the-middle-attack, or the public IP address of available wireless access point 110 is resolved only after connection has been made, the client devices connected to the available wireless access point 110 can be warned or the client devices could be set up to be automatically cut-off from the connection to the available wireless access point 110.

In order to request the reputation of wireless access point 110, the client device 106 needs access to a communication network to send reputation requests to reputation system 108. As an example, available wireless access point 110 may have a landing page and/or traffic blocking enabled. In such cases, the available wireless access point 110 will not allow any connection operation to occur by the client device 106 until after the user of the client device 106 has entered password and or sensitive information such as credit card details to purchase internet time. Even though the available wireless access point 110 may be a trusted wireless access point, the client device 106 should determine that the available wireless access point can be trusted before handing over such sensitive information. To avoid handing over sensitive information prematurely, the client device 106 can perform a wireless access point request query by transmitting a reputation request over a communication network 104 that is different to the communication network 102 offered by the available wireless access point 110. The communication network 102 can be a mobile communication network that can communicate with reputation system 108, for example a 2G/3G/4G or beyond network via a 2G/3G/4G or beyond data connection or even via short message service (SMS). Alternatively, the client device 106 may tunnel its reputation requests or queries over DNS over the available wireless access point 110 (DNS is usually allowed to pass even when HTTP is blocked). On receiving the reputation requests from client device 106, the reputation system 108 can determine the reputation of the available wireless access point 110 and transmits its response via the above-mentioned communication networks or routes.

There are many ways an attacker can "hide" behind what seems to be a legitimately named wireless access point, for example available wireless access point 110 may be legitimate. The reputation system 108 needs to have the ability or a set of heuristic rules that can be used to identify a suspect or rogue wireless access point that may have a unique name that looks legitimate to a user of client device 106. In such a case, the suspect wireless access point (not shown) will not have the same service set identifier (SSID) as the legitimate available wireless access point 110 in a trusted or real Wi-Fi network that is already known by reputation system 108 to be in the area. Alternatively, the suspect wireless access point (not shown) will not have the same base station identifier code as a legitimate base station in a trusted or real mobile communications network. A of heuristic rules can be determined and applied based on this type of behaviour.

As an example, the suspect or rogue wireless access point may be named "Free public Wi-Fi", which an unsuspecting user of a client device 106 may try and connect with. Instead, the client device 106 can send a reputation request including the identity information it has detected about the suspect wireless access point, which may include the public IP address and SSID of the suspect wireless access point. The set of heuristic rules may include looking at the public IP address gained over the suspect wireless access point, ff the public IP address is same as with some trusted wireless access point, for example the wireless access point 110, but the SSID is different, then the reputation system 108 defines the suspect wireless access point as untrusted or suspect i.e. it should not be trusted. This is because the suspect wireless access point could be an attacker having two Wi-Fi cards, one Wi-Fi card accessing the legitimate available wireless access point 110, which is a trusted Wi-Fi connection in the area, and the other Wi-Fi card providing a suspect or rogue wireless access point to allow the attacker to execute a "man-in-the-middle" attack. In addition, another set of heuristic rules could be defined based on determining if the "Free public Wi-Fi" or, for example "Starbucks", wireless access point comes from a normal subscriber DSL, if it does, then it should also not be trusted.

On receiving a response from the reputation system 108 that the wireless access point that client device 106 may be detecting or is connected with is suspect or potentially rogue, the client device 106 will need to find a trusted wireless access point to connect to. The client device 106 could be configured to automatically switch to a safe or trusted wireless access point. In addition to the response from reputation system 108 indicating the suspect wireless access point as suspect, reputation system 108 may transmit further information to client device 106 that identifies a correct or a trusted wireless access point with a given SSID in the area or location of the client device. The user of the client device 106 can instruct the device's operating system to connect to the known trusted wireless access point with the given SSID. Alternatively, the client device 106 may connect automatically with the known trusted wireless access point with the given SSID.

Alternatively, the client device 106 includes an application or software, which when executed, automatically sends reputation system 108 numerous reputation requests associated with the wireless access points available in the area. This will generate numerous corresponding reply messages or responses from reputation system 108 in relation to the reputation of each of the wireless access points. The application collates the responses from reputation system 108 to provide the user with information on the good, known, or trusted wireless access points. The application may automatically hide, or withhold information on those suspect wireless access points having a low or bad reputation (i.e. rogue wireless access points) or have an unknown reputation. In another embodiment, the application communicates via wireless access point queries (eg reputation requests) and responses with the reputation system 108 such that the application displays to the user of the client device 106 only the good, known, or trusted wireless access points and hides those with bad or unknown reputation. This ensures the user of the client device 106 connects to a trusted wireless access point.

In determining whether an available wireless access point 110 is a rogue wireless access point, the reputation system 108 must be aware of changes that may occur with the operation of known or trusted wireless access points. A set of heuristic rules can be used to assist the reputation system 108 in determining legitimate changes occurring in trusted wireless access points. If the reputation system 108 maintains a record of trusted identity information (as previously described) it may also remove a portion of the trusted information from the record when the identity information associated with the portion of trusted information is determined to be unstable over a second period of time. Alternatively, the reputation system 108 may heuristically update the set of identity information associated with the wireless access point and its indication of trust to untrusted if the identity information in the set is determined to be unstable over the second period of time. The second period of time may be shorter than the first period of time or the period of time when the information is deemed to be stable or unchanging.

However, false alarms need to be avoided when a trusted wireless access point is treated as suspect because of legitimate changes to the trusted wireless access point's identity information. This could occur when trusted or known wireless access point operators change hardware or public IP addresses or other identifying factors. The reputation system 108 or a set of heuristic rules can be configured to identify and prevent false alarms in these cases by using partial information matching. If collected identity information about the available wireless access point 110 changes partially, the remaining historical information can be considered to be reliable or good and the mismatching information can be updated in the set, record, memory 124 or database 126 operated by reputation system 108. This means the available wireless access point 110 can still be considered as trusted or have a "good" reputation.

However, in maintaining the sets of identity information or the record of trusted information, the reputation system 108 may deem the available wireless access point 110 to be trusted only if all subsequent reputation requests (or wireless access point query requests) from client devices 106 and 112, after the change in identity information occurs, only indicate the new updated identity information. For example, changing a MAC address or public IP address can be deemed by the reputation system 108 to be allowed if one identity information feature changes and the reputation system 108 receives new reputation requests (or wireless access point query requests) based only on the new information. That is, the identity information associated with the available wireless access point is considered stable again.

However, if the reputation system 108 receives reputation requests (wireless access point query requests) from client devices 106 and 112 in the same area with both new and old information, for example new and old public IP and/or MAC addresses, then the reputation system 108 should respond to the reputation requests (or wireless access point queries) that the reputation of the wireless access point 110 is unknown, untrusted, suspect or potentially a rogue wireless access point, so it should not be trusted. The identity information associated with the available wireless access point is considered unstable.

The above communication system 100 was described, for simplicity, with respect to a reputation system 108 and a client device 106. It is to be appreciated that the suspect Wi-Fi detection process or methods performed by reputation system 108 could be hosted in a cloud based system or cloud computing arrangement, where the functions of reputation system 108 are distributed within the cloud based system or arrangement. The process of detecting suspect Wi-Fi access points could be shared amongst several or a multiplicity of servers, computer systems, and/or databases of varying size and memory. This ensures that if reputation system 108 suddenly receives multiple reputation requests from the plurality of client devices 112 or simply the suspect wireless access point detection becomes more popular, the cloud based system can automatically direct more individual processors, servers, or databases to work on serving and processing the incoming reputation requests and the necessary outgoing responses. The cloud computing arrangement may include a plurality of servers and databases for receiving reputation requests associated with wireless access points from a multiplicity of client devices, storing and updating the identity information received, determining data representing the reputation of the associated wireless access points, and transmitting responses to each of the multiplicity of client devices over a network.

Figure 2:
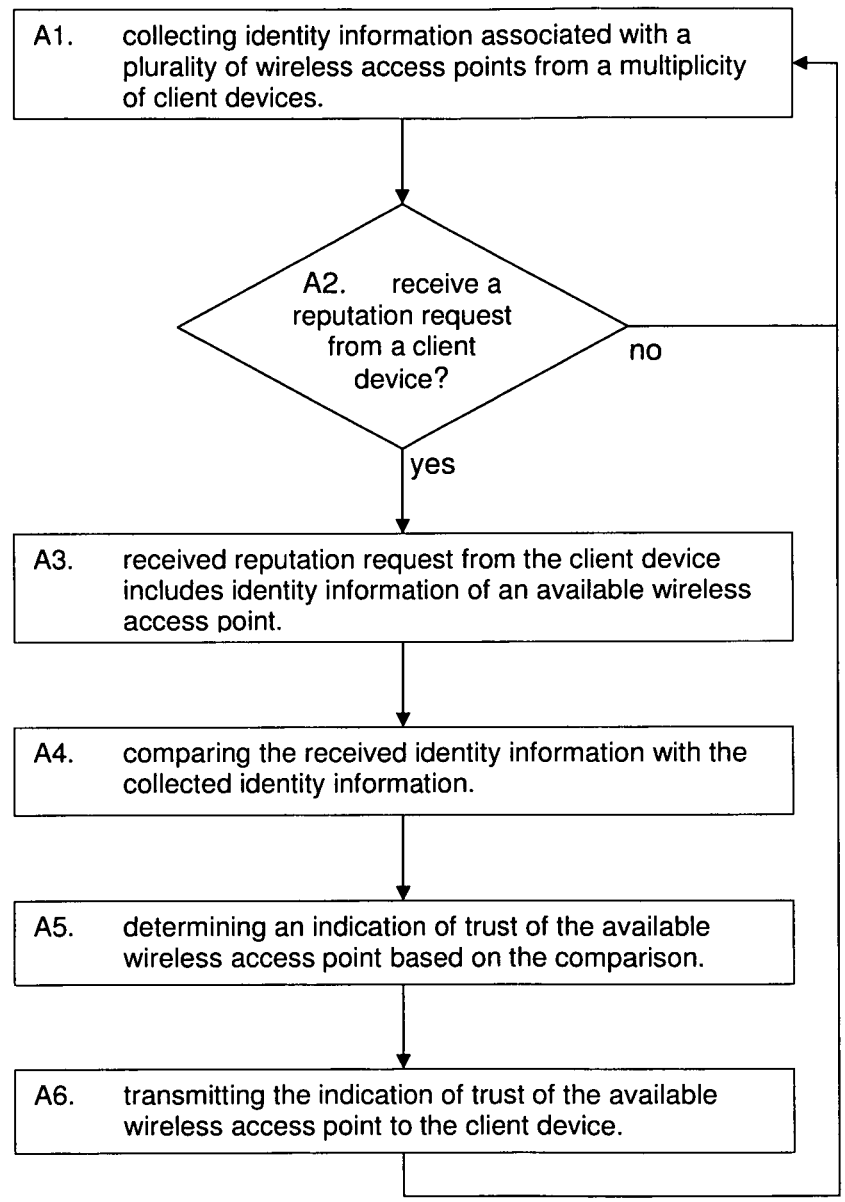
FIG. 2 is a flow diagram illustrating a process performed at a server according to an embodiment of the invention.

FIG. 2 is a flow diagram illustrating a method of detecting a suspect wireless access point in a communication network 102 including wireless access points 110 and 114 for providing access services to client devices 106 and 112. As described with reference to FIG. 1, the communication network 102 includes available wireless access point 110, client device 106, a plurality of wireless access points 112, and a multiplicity of client devices 112. The method for detecting a suspect wireless access point in communication network 102 is outlined by the following steps:

A1. Collecting identity information associated with the wireless access points 106 and 114 from a multiplicity of client devices 112. The reputation system 108 may collect and store the identity information. The identity information can be received and collected from multiple sources, such as being received in reports from the multiplicity of client devices 106 and/or 112 and/or collected from reputation requests from the client devices 106 and/or 112. Proceed to step A2.

A2. If a reputation request is received from a client device 106, then proceed to step A3. Otherwise proceed to step A1 for collecting further identity information from the multiplicity of client devices.

A3. The reputation request is received from the client device 106. The reputation request includes identity information of an available wireless access point 110. Proceed to step A4.

A4. Comparing the received identity information with the collected identity information. The received identity information may be compared with arranged sets of identity information. Proceed to step A5.

A5. Determining an indication of trust of the available wireless access point 110 based on the comparison. Proceed to step A6.

A6. Transmitting data representative of the indication of trust of the available wireless access point 110 to the client device 106. The received identity information can be incorporated into the collected identity information for further arranging/processing/storage. Proceed to step A1 for further collection and/or maintenance of further identity information from the multiplicity of client devices 106 and 112.

Optionally, in step A1, the collected identity information may be arranged or organised into sets of identity information associated with the wireless access points. An indication of trust for each set of identity information or wireless access point can be determined from heuristic algorithms or rules. Alternatively or in addition to, step A6 may further include determining the indication of trust of the available wireless access point 110 is untrusted when significant identity information associated with the received identity information is substantially different to the corresponding significant identity information associated with a trusted wireless access point. The wireless access points 110 and 114 may include, but are not limited to, at least one type of wireless access point in the group of a cellular wireless access point (eg a GSM, LTE, 2G/3G/4G or beyond access point), a base station, a Wi-Fi access point, and any other wireless access point used for connecting client devices to a communications network.

Pieces or portions of the identity information associated with each wireless access point are considered to be significant if these pieces can be used to substantially identify the wireless access point. For example, the significant identity information may include an identity code of the wireless access point, an address or cell identifier of the wireless access point, a hardware identifier of the wireless access point, and/or an identifier of the wireless access point. Alternatively or in addition to, the significant identity information may include at least one of a wireless access point identity code, a base station identity code, public internet protocol (IP) address of the wireless access point, a Media Access Control (MAC) address of the wireless access point, a service set identifier (SSID) of the wireless access point, a cell identifier of the wireless access point, and/or a base station identifier of the wireless access point. This provides the advantage of rapidly identifying a suspect wireless access point if certain significant portion of the important identity information about an available wireless access point changes.

Collecting identity information in step A1 may include receiving a report from one of the client devices 106 or 112 indicating the available wireless access point 110 as untrusted or suspect and defining the indication of trust or reputation of the available wireless access point 110 as untrusted or suspect. The client device 106 or 112 may have been the victim of a malicious attack such as a phishing or man-in-the-middle attack in relation to the available wireless access point 110 and by reporting this to the reputation system 108, then other client devices 106 and 112 connected or about to connect to the available wireless access point 110 can be warned. In response, step A1 may further include, in response to the report, setting the indication of trust associated with the available wireless access point to untrusted. In step A1, in response to receiving the report, may also include transmitting data representative of the indication of trust of the available wireless access point to the client devices associated with the available wireless access point.

The process in step A3 may optionally include receiving one or more of the reputation requests over a second communication network 104 different to the communication network 102 that includes the wireless access points 114. This provides the advantage of increasing the likelihood that the reputation request(s) are received by the reputation system 108 without being interfered with by an attacker, this will allow the client device 106 to receive the appropriate response from the reputation system 108 securely. The process in step A1 may further include updating the collected identity information with the received identity information of the reputation request from client device 106, the received identity information associated with the available wireless access point 110.

Figure 3:
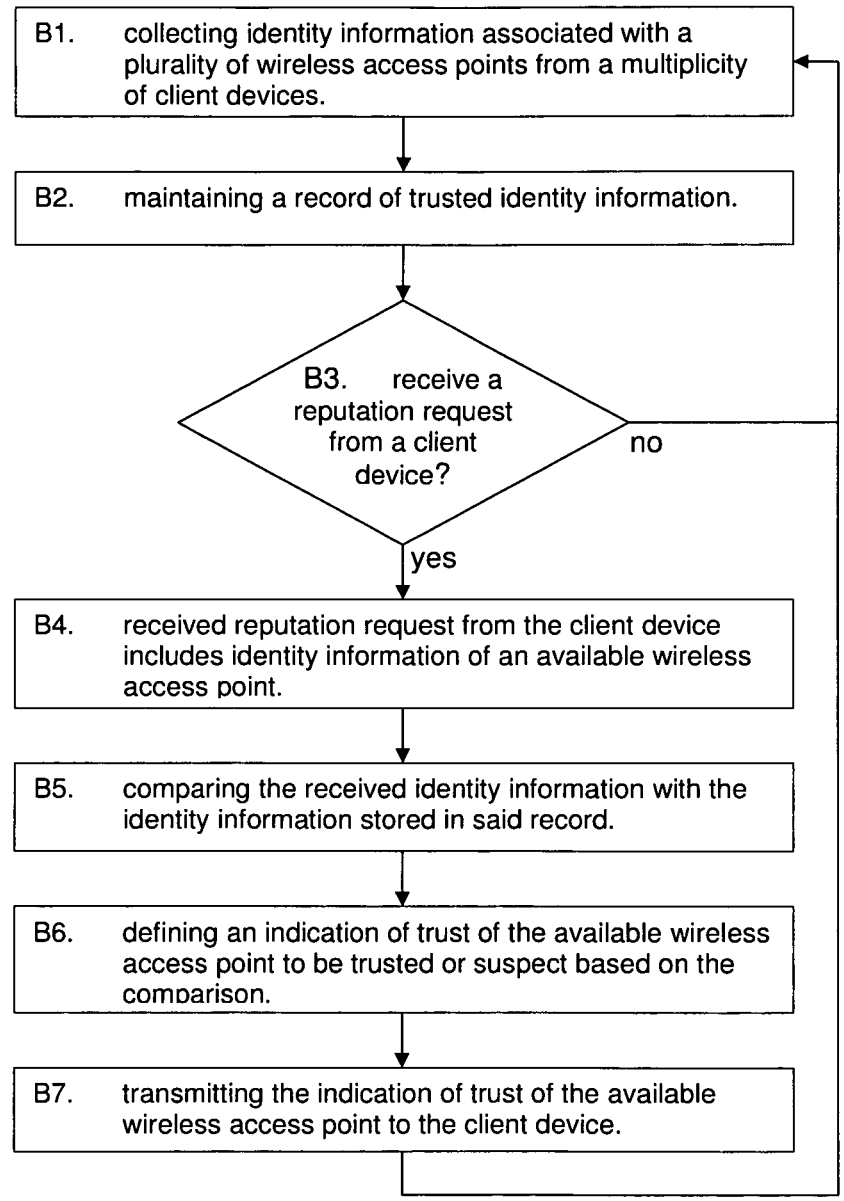
FIG. 3 is another flow diagram illustrating a process performed at a server according to another embodiment of the invention.

FIG. 3 is another flow diagram illustrating a method of detecting a suspect wireless access point in a communication network 102 including wireless access points 110 and 114 providing access services to client devices 106 and 112. As described with reference to FIG. 1, the communication network 102 includes available wireless access point 110, client device 106, a plurality of wireless access points 114, and a multiplicity of client devices 112. The method for detecting a suspect wireless access point in communication network 102 is outlined by the following steps:

B1. Collecting identity information associated with the wireless access points 106 and 114 from a multiplicity of client devices 112. The reputation system 108 may collect and store the identity information. The identity information can be received and collected from multiple sources, such as being received in reports from the multiplicity of client devices 106 and/or 112 and/or collected from reputation requests from the client devices 106 and/or 112. Proceed to step B2, or step B2 is performed concurrently with step B1.

B2. Maintaining a record of trusted identity information, where trusted information is added to the record when the identity information is determined to be stable over a period of time. The record of trusted identity information is based on the collected identity information and may be stored in a database 128 or incorporated into a neural network processing structure 128. Proceed with step B3.

B3. If a reputation request is received from a client device 106, then proceeds to step B4. Otherwise proceed to step B1 and/or B2 for collecting and maintaining further identity information from the multiplicity of client devices.

B4. The reputation request is received from the client device 106. The reputation request includes identity information of an available wireless access point 110. Proceed to step B5.

B5. Comparing the received identity information with the identity information stored in said record. Proceed to step B6.

B6. Defining an indication of trust or reputation of the available wireless access point 110 to be trusted or suspect based on the comparison. Proceed to step B7.

B7. Transmitting the data representative of the indication of trust or reputation of the available wireless access point 110 to the client device 106. The received identity information can be incorporated into the collected identity information for further processing/storage. Proceed to step B1 and/or B2 for further collection and/or maintenance of further identity information from the multiplicity of client devices 106 and 112.

In step B2, the process may optionally include removing a portion of the trusted information from the record when the identity information associated with the portion of trusted information is determined to be unstable over a second period of time.

In step B6, the process may further include defining the reputation of the available wireless access point 110 as trusted when the received identity information substantially matches the trusted information stored in the record. Alternatively or in addition to, step B6 may further include defining the reputation of the available wireless access point 110 as suspect when significant identity information associated with the received identity information is substantially different to the corresponding significant identity information associated with the trusted information stored in the record. The wireless access points 110 and 114 may include, but are not limited to, at least one type of wireless access point in the group of a cellular wireless access point (eg a GSM, LTE, 2G/3G/4G or beyond access point), a base station, a Wi-Fi access point, and any other wireless access point used for connecting client devices to a communications network.

Pieces or portions of the identity information associated with each wireless access point are considered to be significant if these pieces can be used to substantially identify the wireless access point. For example, the significant identity information may include an identity code of the wireless access point, an address or cell identifier of the wireless access point, a hardware identifier of the wireless access point, and/or an identifier of the wireless access point. Alternatively or in addition to, the significant identity information may include at least one of a wireless access point identity code, a base station identity code, public internet protocol (IP) address of the wireless access point, a Media Access Control (MAC) address of the wireless access point, a service set identifier (SSID) of the wireless access point, a cell identifier of the wireless access point, and/or a base station identifier of the wireless access point. This provides the advantage of rapidly identifying a suspect wireless access point if certain significant portion of the important identity information about an available wireless access point changes.

Collecting identity information in step B1 may include receiving a report from one of the client devices 106 or 112 indicating the available wireless access point 110 as suspect and defining the reputation of the available wireless access point 110 as suspect. The client device 106 or 112 may have been the victim of a malicious attack such as a phishing or man-in-the-middle attack in relation to the available wireless access point 110 and by reporting this to the reputation system 108, then other client devices 106 and 112 connected or about to connect to the available wireless access point 110 can be warned. In response, step B2 may further include, in response to the report, removing the portion of the trusted information associated with the identity information of the available wireless access point from the record. In step B2, in response to receiving the report, may also include transmitting the reputation of the available wireless access point to the client devices associated with the available wireless access point.

The process in step B3 may optionally include receiving one or more of the reputation requests over a second communication network 104 different to the communication network 102 that includes the wireless access points 114. This provides the advantage of increasing the likelihood that the reputation request(s) are received by the reputation system 108 without being interfered with by an attacker, this will allow the client device 106 to receive the appropriate response from the reputation system 108 securely. The process in step B1 may further include updating the collected identity information with the received identity information of the reputation request from client device 106, the received identity information associated with the available wireless access point 110.

It is to be appreciated that various modifications may be made to the above described examples and embodiments and/or one or more features of the above described examples and embodiments may be combined with each other to realise a reputation system 108 according to the invention.

Figure 4:
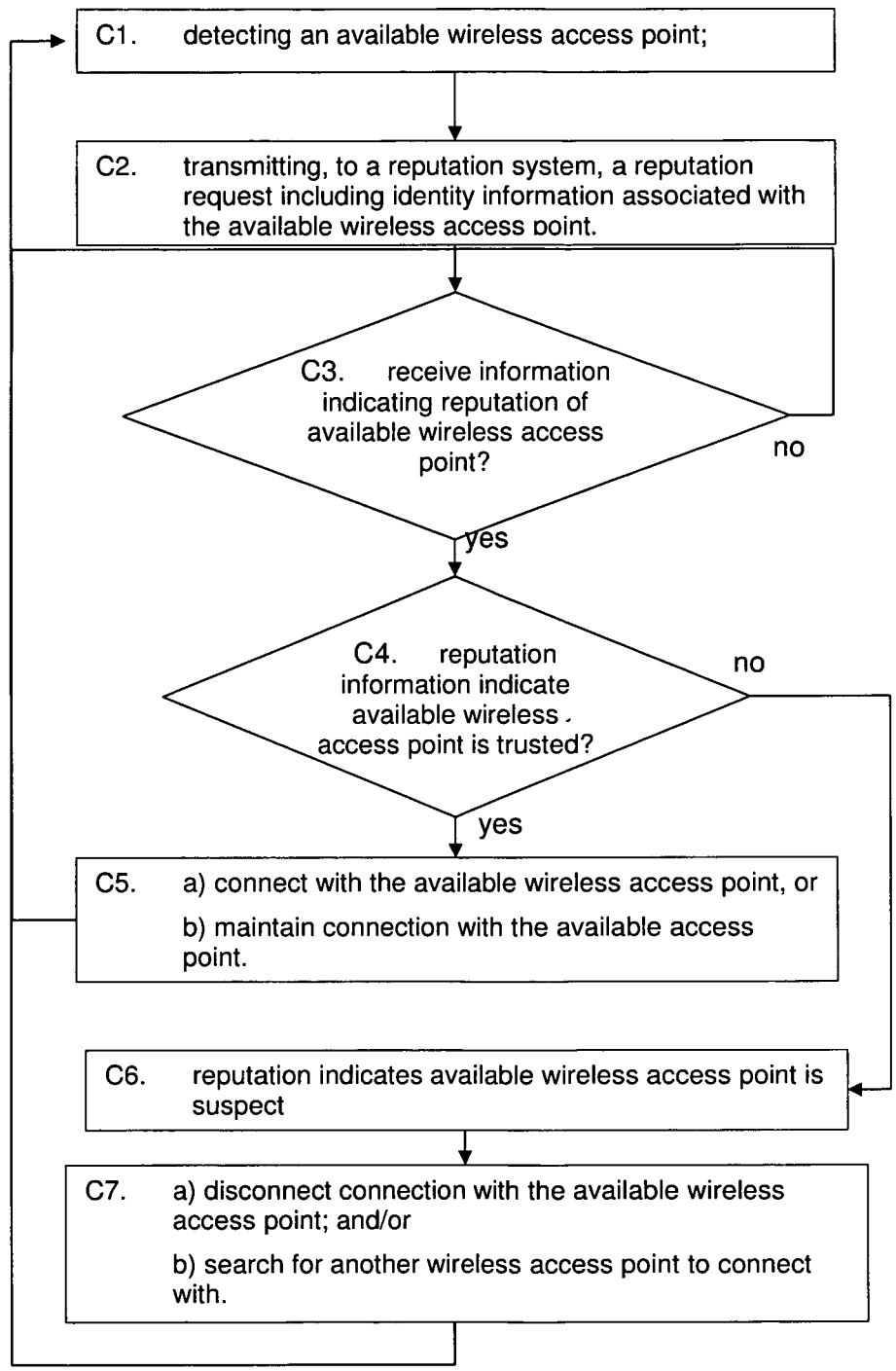
FIG. 4 is a flow diagram illustrating a process performed at a client device according to an embodiment of the invention.

FIG. 4 is a flow diagram illustrating a method or process performed by a client device 106 for detecting whether a wireless access point is a suspect wireless access point in a communication network 102. As described with reference to FIG. 1, the communication network 102 includes wireless access point 110, the client device 106, a plurality of wireless access points 114 and a multiplicity of client devices 112. The steps performed at the client device 106, for detecting a suspect wireless access point in communication network 102, are outlined as follows:

C1. Detecting an available wireless access point 110. The client device 106 may detect or connect with the available wireless access point 110.

C2. Transmitting to a reputation system 108 a reputation request including identity information associated with the available wireless access point 110. The identity information associated with the available wireless access point 110 can be one or more wireless access point parameters that the client device 106 can detect about the available wireless access point 110. These parameters may include, among other parameters as already described with reference to FIG. 1, the public IP address, the SSID, the MAC address of the available wireless access point 110.

C3: The client device 106 waits for a response to the reputation request or any information associated with the indication of trust or reputation of the available wireless access point 110. In the meantime, client device 106 may have connected with the available wireless access point 110 or it may transmit further reputation requests of other available wireless access points to reputation system 108. On receiving from the reputation system data representative of the indication of trust or reputation associated with the available wireless access point 110, the client device 106 performs step C4.

C4. The client device 106 checks whether the indication of trust or reputation indicates the available wireless access point 110 is trusted. If it does, then the method proceeds to step C5, otherwise, proceed to step C6.

C5 The client device 106 either:
  a) connects with the available wireless access point 110 if it has not already done so; or
  b) maintains its connection with the available wireless access point 110 for accessing the communication network 102. The process then proceeds to step C3, where it may receive further information associated with the reputation of the available wireless access point 110 from reputation system 108, due to subsequent identity information received at reputation system 108 that may change the reputation indication of the available wireless access point 110.

C6. As the reputation received from reputation system 108 indicates the available wireless access point 110 is untrusted or suspect, i.e. potentially rogue, the method proceeds to step C7.

C7. The client device 106 performs the following operations:
  a) disconnect from the available wireless access point 110; and/or
  b) detecting or searching for another available wireless access point for access to the communication network.

Optionally, step C2 may include transmitting the reputation request from the client device 106 to the reputation system 108 over a second communication network 104 that is different to the communication network 102, which includes the available wireless access point 110. The method may further include the client device 106 detecting a malicious attack (eg a phishing or a man-in-the-middle attack) on the client device 106 when connected to the available wireless access point 110 and, in response, transmitting, to the reputation system 108, further information reporting the available wireless access point 110 as suspect. The client device 106, on detecting the attack, may then warn the user of client device 106 to disconnect from the available wireless access point 110 or the client device 106 may automatically disconnect from the available wireless access point 110. This will minimise other client devices from becoming victim to an attack from the now suspect available wireless access point 110.

The step C3 may optionally include receiving further reputation information from the reputation system 108 associated with the available wireless access point 110. This may occur after the client device 106 has connected or has maintained its connection with the available wireless access point 110. If the reputation indicates the available wireless access point 110 as suspect, then in response, the user of the client device 106 is notified that the available wireless access point is suspect or the client device 106 automatically disconnects from the available wireless access point 110 and detects/searches for another available wireless access point for connecting to the communication network 102.

The client devices, wireless access points, reputation system, servers and computing systems as described herein each may perform detection of suspect wireless access points in a communication network. The processors of such systems are configured to execute computer program instructions based on the methods and processes described herein, such instructions being contained in a computer-readable medium, such as memory. The computer program instructions may be read into memory from another computer-readable medium or from another device via a communication interface. The instructions contained in memory cause the processor of a client device, reputation system, server, or other such computer system to perform processes or methods as described herein. Alternatively or in addition to, hardwired circuitry may be used in place of or in combination with the computer program instructions to implement processes and methods consistent with the present invention. Examples of hardware circuitry may include, but are not limited to, semiconductor chips, integrated circuits, field programmable gate arrays, application-specific integrated circuits, electronically programmable integrated circuits and the like. Thus, the present invention is not limited to any specific combination of hardware circuitry and/or software.

In particular, a computer program including computer program code means or program instructions, which when executed on a processor or other circuitry, performs the steps of detecting suspect wireless access point in a communication network, including a plurality of wireless access points providing access services to client devices, by collecting identity information associated with the wireless access points from a multiplicity of client devices. On receiving reputation request from a client device, the request including identity information of an available wireless access point, performing the steps of comparing the received identity information with the collected identity information to determine an indication of trust of the available wireless access point based on the comparison, and transmitting the indication of trust of the available wireless access point to the client device.

In addition, a computer program including computer program code means or program instructions, which when executed on a processor or other circuitry of a client device, performs the steps of detecting suspect wireless access point in a communication network, including a plurality of wireless access points providing access services to client devices, by detecting an available wireless access point and transmitting to a reputation system a reputation request including identity information associated with the available wireless access point. Receiving from the reputation system an indication of trust or reputation associated with the available wireless access point. The computer program further performs the steps of connecting with the available wireless access point or maintaining a connection with the available wireless access point when the indication of trust or reputation indicates the available wireless access point is trusted. The computer program further performs the steps of disconnecting from the available wireless access point and/or detecting another available wireless access point when the reputation indicates the available wireless access point is, among other things, untrusted, unknown or suspect.

The computer readable medium may include computer program instructions stored thereon, which when executed on one or more processors of a reputation system or other computing system, performs the processes or method steps of detecting suspect wireless access points in a communication network as described herein. In addition, a computer readable medium including computer program instructions stored thereon, which when executed on one or more processors of a client device or other like device, performs the processes or method steps of detecting suspect wireless access points in a communication network as described herein.

Although the identity information associated with a wireless access point or wireless access point identity information has been described, by way of example only, with respect to various types of wireless access points (eg Wi-Fi access points), it is to be appreciated that these examples, methods, apparatus as described herein are applicable to other wireless access points such as, but not limited to, wireless access points, radio base stations, femto-cell base stations, cellular or mobile base stations, or any other base station or wireless access point based on second, third, fourth generation (2G/3G/4G) and beyond mobile technologies or standards (eg GSM, CDMA-2000, UMTS, WiMAX, LTE, LTE Advanced) and their equivalent or similar identity information, and any other wireless access point used for connecting client devices to a communications network.

It will be appreciated by the person of skill in the art that various modifications may be made to the above described embodiments and/or one or more features of the described embodiments may be combined without departing from the scope of the present invention.

The invention claimed is:

1. A method of operating a reputation system for detecting a suspect wireless access point in a communication network including a plurality of wireless access points providing access services to client devices, the method, performed by the reputation system, comprising: collecting identity information associated with the wireless access points from a multiplicity of client devices; maintaining the collected identity information as sets of identity information, each set of identity information associated with one of the wireless access points, wherein significant identity information in each set of identity information comprises portions of identity information in the set that can be used to identify the wireless access point associated with said set of identity information; receiving identity information associated with a trusted wireless access point; updating the set of identity information associated with the trusted wireless access point, by: determining the indication of trust of the trusted wireless access point to be trusted if a portion of the received identity information differs from the corresponding portion of significant identity information of the trusted wireless access point and subsequent received identity information associated with the trusted wireless access point matches the received identity information for a first period of time such that the set of identity information is considered stable; determining the indication of trust of the trusted wireless access point to be untrusted or unknown when subsequently received identity information associated with the trusted wireless access point is substantially different to the corresponding significant identity information for a second period of time such that the set of identity information is considered unstable; and updating the set of identity information associated with the trusted wireless access point with the received identity information; receiving a reputation request from a client device, the request including identity information of an available wireless access point; comparing the received identity information of the reputation request with the-sets of identity information to determine an indication of trust of the available wireless access point; and transmitting the indication of trust of the available wireless access point to the client device for use in determining whether to connect to the available wireless access point.

2. A method according to claim 1, wherein the portion of the received identity information that differ from the significant identity information associated with the trusted wireless access point includes at least one of a public address of the wireless access point, a hardware identifier or address of the wireless access point, an identifier of the wireless access point.

3. A method according to claim 1, further comprising heuristically determining an indication of trust associated with each set of identity information.

4. A method according to claim 3, wherein the step of comparing further comprises comparing the received identity information with the sets of identity information associated with each wireless access point, and determining the indication of trust of the available wireless access point from the indication of trust of a corresponding set of identity information.

5. A method according to claim 1, further comprising maintaining a record of trusted identity information, wherein trusted information is added to the record when the identity information is determined to be stable over a first period of time, wherein the step of comparing further includes comparing the received identity information with the identity information stored in said record to determine the indication of trust.

6. A method according to claim 5, wherein maintaining the record of trusted identity information includes removing a portion of the trusted information from the record when the identity information associated with the portion of trusted information is determined to be unstable over a second period of time, the second period of time being shorter than the first period of time.

7. A method according to claim 5, further comprising determining the indication of trust of the available wireless access point to be trusted when the received identity information substantially matches the trusted information stored in the record.

8. A method according to claim 5, further comprising determining the indication of trust of the available wireless access point to be untrusted or unknown when significant identity information associated with the received identity information is substantially different to the corresponding significant identity information associated with the trusted information stored in the record.

9. A method according to claim 8, wherein the significant identity information includes at least one of a public address of the wireless access point, a hardware identifier or address of the wireless access point, an identifier of the wireless access point.

10. A method according to claim 9, wherein the public address is a public internet protocol (IP) address or cell identifier, the hardware identifier or address is a MAC address, and/or the identifier is a service set identifier (SSID) or a base station identifier.

11. A method according to claim 2, wherein the public address is a public internet protocol (IP) address or cell identifier, the hardware identifier or address is a MAC address, and/or the identifier is a service set identifier (SSID) or a base station identifier.

12. A method according to claim 1, further comprising receiving a report from one of the client devices when said one of the client devices detects malicious behaviour of the available wireless access point, the report indicating the available wireless access point to be untrusted and determining the indication of trust of the available wireless access point to be untrusted.

13. A method according to claim 12, further comprising transmitting the indication of trust of the available wireless access point to the client devices associated with the available wireless access point.

14. A method according to claim 13, comprising receiving a report from one of the client devices when said one of the client devices detects malicious behaviour of the available wireless access point, the report indicating the available wireless access point to be untrusted and determining the indication of trust of the available wireless access point to be untrusted, wherein maintaining the record of trusted identity information includes removing the portion of the trusted information associated with the identity information of the available wireless access point from the record.

15. A method according to claim 1, wherein the identity information associated with each of the wireless access points include at least one wireless access point parameter in the group of:
   a public address of the wireless access point;
   a hardware identifier or address of the wireless access point;
   an identifier of the wireless access point;
   a cell identifier;
   a base station identity code;
   a communication network operator identity;
   an internal interne protocol (IP) address or address range of the wireless access point;
   a public IP address of the wireless access point;
   a connection type for the public IP address of the wireless access point;
   the wireless access point type;
   a service set identifier (SSID) of the wireless access point;
   the client device's physical location;
   a wireless signal strength of the wireless access point;
   a wireless network type of the wireless access point;
   the security settings of the wireless access point;
   data representative of the ability to send reputation requests over the wireless access point;
   data representative of the ability to correctly resolve domain name server queries over the wireless access point;
   frequencies and channels used by the wireless access point; and
   information or data representative of the identity or signature of the wireless access point.

16. A method according to claim 1, wherein the wireless access points include at least one in the group of a cellular wireless access point, a base station wireless access point, a Wi-Fi access point, and any other wireless access point used for connecting the client device to the communication network.

17. A method according to claim 1, further comprising receiving one or more of the reputation requests over a second communication network different to the communication network including the wireless access points.

18. A method according to claim 1, further comprising updating the collected identity information with the received identity information associated with the available wireless access point.

19. A method according to claim 1, further comprising receiving the reputation request from the client device via at least one of: the available wireless access point over a public communication network; the available wireless access point using domain name server tunneling; a second communication network using short messaging service; and the second communication network using a 2G/3G/4G or beyond data connection.

20. A non-transitory computer readable medium including computer program instructions stored thereon, which when executed on one or more processors of a server or reputation system, performs the method steps of claim 1.

21. A method for a client device to detect a suspect wireless access point in a communication network, the method comprising: detecting an available wireless access point for providing access services to the client device, wherein the available wireless access point has a reputation that is unknown to the client device; transmitting a reputation request, the reputation request including identity information associated with the available wireless access point; receiving, in response to the reputation request, from the reputation system an indication of trust associated with the available wireless access point the client device is connecting with, connecting with the available wireless access point when the indication of trust indicates the available wireless access point to be trusted; and detecting another available wireless access point when the indication of trust indicates the available wireless access point as suspect or untrusted; and wherein the reputation system is configured for maintaining a record of available wireless access points and indications of trust for the available wireless access points, updating the record based on transmitting reputation requests associated with the available wireless access points and on the received indications of trust of the available wireless access points; and wherein the record comprises collected identity information as sets of identity information, each set of identity information associated with one of the wireless access points, wherein significant identity information in each set of identity information comprises portions of identity information in the set that can be used to identify the wireless access point associated with said set of identity information; and wherein the indication of trust of available wireless access points are considered to be trusted if a portion of the received identity information differs from the corresponding portion of significant identity information of the trusted wireless access point and subsequent received identity information associated with the trusted wireless access point matches the received identity information for a first period of time such that the set of identity information is considered stable; and wherein the indication of trust of available wireless access points are considered to be untrusted or unknown when subsequently received identity information associated with the trusted wireless access point is substantially different to the corresponding significant identity information for a second period of time such that the set of identity information is considered unstable.

22. A method according to claim 21, further comprising transmitting the reputation request to the reputation system via at least one of: the available wireless access point over a public communication network; the available wireless access point using domain name server tunneling; a second communication network using short messaging service; and the second communication network using a 2G/3G/4G or beyond data connection.

23. A method according to claim 21, further comprising the step of detecting a malicious attack on the client device when connected to the available wireless access point and, in response, transmitting to the reputation system further information reporting the available wireless access point to be suspect or untrusted.

24. A method according to claim 21, further comprising receiving indication of trust information from the reputation system indicating the available wireless access point is suspect or untrusted, and in response, notifying the user of the client device the available wireless access point is suspect or untrusted, or disconnecting from the available wireless access point.

25. A method according to claim 21, wherein the identity information of the available wireless access point includes at least one wireless access point parameter in the group of:
   a public address of the wireless access point;
   a hardware identifier or address of the wireless access point;
   an identifier of the wireless access point;
   a cell identifier;
   a base station identity code;
   a communication network operator identity;
   an internal interne protocol (IP) address or address range of the wireless access point;
   a public IP address of the wireless access point;
   a connection type for the public IP address of the wireless access point;
   the wireless access point type;
   a service set identifier (SSID) of the wireless access point;
   the client device's physical location;
   a wireless signal strength of the wireless access point;
   a wireless network type of the wireless access point;
   the security settings of the wireless access point;
   data representative of the ability to send reputation requests over the wireless access point;
   data representative of the ability to correctly resolve domain name server queries over the wireless access point;
   frequencies and channels used by the wireless access point; and
   information or data representative of the identity or signature of the wireless access point.

26. A method according to claim 21, wherein the wireless access points include at least one in the group of a cellular wireless access point, a base station wireless access point, a Wi-Fi access point, and any other wireless access point used for connecting the client device to the communication network.

27. A non-transitory computer readable medium including computer program instructions stored thereon, which when executed on one or more processors of a client device, performs the method steps of claim 21.

28. A server for use in detecting a suspect wireless access point in a communication network including a plurality of wireless access points providing access services to client devices, the server comprising:
   a receiver, a transmitter, a memory unit, and processing logic, the processing logic being connected to the receiver, to the transmitter, and to the memory unit wherein:
   the receiver and processing logic are configured for:
      collecting identity information associated with the wireless access points from a multiplicity of client devices;
      maintaining the collected identity information as sets of identity information, each set of identity information associated with one of the wireless access points, wherein significant identity information in each set of identity information comprises portions of identity information in the set that can be used to identify the wireless access point associated with said set of identity information;
      receiving identity information associated with a trusted wireless access point;
      updating the set of identity information associated with the trusted wireless access point, by:
         determining the indication of trust of the trusted wireless access point to be trusted if a portion of the received identity information differs from the corresponding portion of significant identity information of the trusted wireless access point and subsequent received identity information associated with the trusted wireless access point matches the received identity information for a first period of time such that the set of identity information is considered stable;
         determining the indication of trust of the trusted wireless access point to be untrusted or unknown when subsequently received identity information associated with the trusted wireless access point is substantially different to the corresponding significant identity information for a second period of time such that the set of identity information is considered unstable; and
   updating the set of identity information associated with the trusted wireless access point with the received identity information;
      the receiver is further configured to receive a reputation request from a client device, the request including identity information of an available wireless access point;
      the processing logic includes comparing logic for comparing the received identity information of the reputation request with the sets of identity information, and determining logic for determining an indication of trust of the available wireless access point based on the comparison; and
      the transmitter is configured to transmit the indication of trust of the available wireless access point to the client device for use in determining whether to connect to the available wireless access point.

29. A server according to claim 28, wherein the wireless access points include at least one in the group of a cellular wireless access point, a base station wireless access point, a Wi-Fi access point, and any other wireless access point used for connecting the client device to the communication network.

30. A server according to claim 28, further comprising receiving the reputation request from the client device via at least one of: the available wireless access point over a public communication network; the available wireless access point using domain name server tunneling; a second communication network using short messaging service; and the second communication network using a 2G/3G/4G or beyond data connection.

31. A reputation system for use in detecting a suspect wireless access point in a communication network including a plurality of wireless access points providing access services to client devices, the reputation system comprising at least one server according to claim 28, in communication with a database for storing and processing the collected identity information for use in determining an indication of trust associated with each of the wireless access points.

32. A reputation system according to claim 31, wherein the wireless access points include at least one in the group of a cellular wireless access point, a base station wireless access point, a Wi-Fi access point, and a wireless access point.

33. A client device for use in detecting a suspect wireless access point in a communication network including a plurality of wireless access points providing access services to client devices, the client device comprising: a receiver, a transmitter, a memory unit, and processing logic, the processing logic being connected to the receiver, to the transmitter, and to the memory unit wherein: the receiver and processing logic are configured for detecting an available wireless access point providing access services to the client device; the transmitter is configured to transmit to a reputation system a reputation request when the client device connects to the available wireless access point, the reputation request including identity information associated with the available wireless access point; the receiver is further configured to receive from the reputation system, in response to the reputation request, an indication of trust associated with the available wireless access point the client device is connecting with; the processor logic is configured to: connect with the available wireless access point or maintain a connection with the available wireless access point when the indication of trust indicates the available wireless access point to be trusted; and disconnect from the available wireless access point and/or detecting another available wireless access point when the indication of trust indicates the available wireless access point as suspect or untrusted; and wherein the reputation system is configured for maintaining a record of available wireless access points and indications of trust for the available wireless access points, updating the record based on transmitting reputation requests associated with the available wireless access points and on the received indications of trust of the available wireless access points; and wherein the record comprises collected identity information as sets of identity information, each set of identity information associated with one of the wireless access points, wherein significant identity information in each set of identity information comprises portions of identity information in the set that can be used to identify the wireless access point associated with said set of identity information; and wherein the indication of trust of available wireless access points are considered to be trusted if a portion of the received identity information differs from the corresponding portion of significant identity information of the trusted wireless access point and subsequent received identity information associated with the trusted wireless access point matches the received identity information for a first period of time such that the set of identity information is considered stable; and wherein the indication of trust of available wireless access points are considered to be untrusted or unknown when subsequently received identity information associated with the trusted wireless access point is substantially different to the corresponding significant identity information for a second period of time such that the set of identity information is considered unstable.

34. A client device according to claim 33, wherein the wireless access points include at least one in the group of a cellular wireless access point, a base station wireless access point, a Wi-Fi access point, and any other wireless access point used for connecting the client device to the communication network.

35. A client device according to claim 33, wherein the transmitter is further configured to transmit the reputation request to the reputation system via at least one of: the available wireless access point over a public communication network; the available wireless access point using domain name server tunneling; a second communication network using short messaging service; and the second communication network using a 2G/3G/4G or beyond data connection.

* * * * *

UNITED STATES PATENT AND TRADEMARK OFFICE
CERTIFICATE OF CORRECTION

| | | |
|---|---|---|
| PATENT NO. | : 8,655,312 B2 | Page 1 of 1 |
| APPLICATION NO. | : 13/136848 | |
| DATED | : February 18, 2014 | |
| INVENTOR(S) | : Stahlberg et al. | |

It is certified that error appears in the above-identified patent and that said Letters Patent is hereby corrected as shown below:

In the Claims

In Claim 1:
Column 24, line 5, "device" should be deleted in-between "client" and "the".

In Claim 15:
Column 25, line 38, "interne" should be deleted and --internet-- should be inserted.

In Claim 25:
Column 27, line 24, "interne" should be deleted and --internet-- should be inserted.

Signed and Sealed this
Twenty-seventh Day of May, 2014

Michelle K. Lee
*Deputy Director of the United States Patent and Trademark Office*